Sept. 17, 1946.    W. H. KLIEVER    2,407,838
MEASURING APPARATUS
Filed Sept. 30, 1942
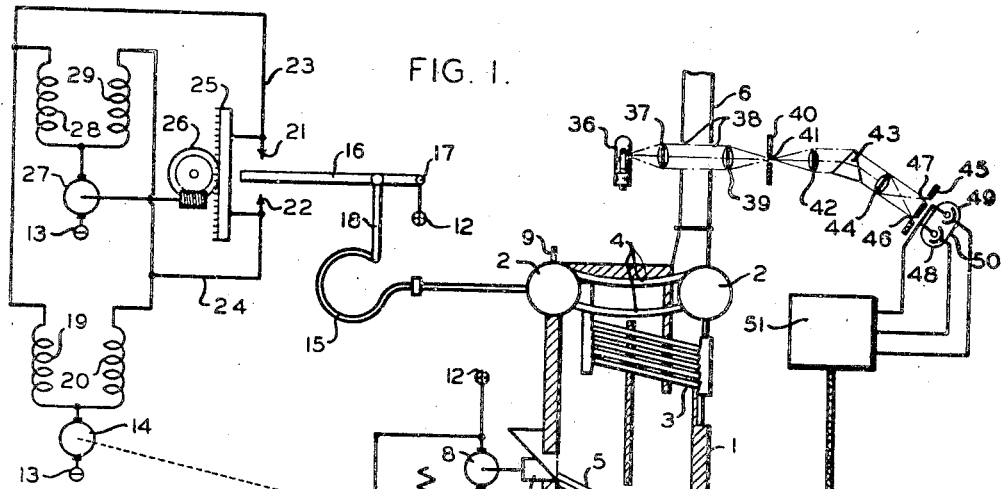
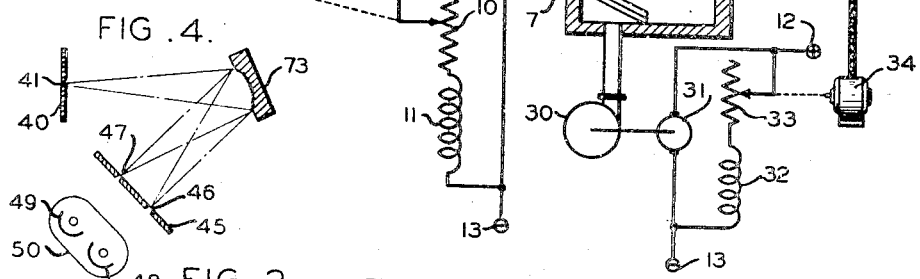
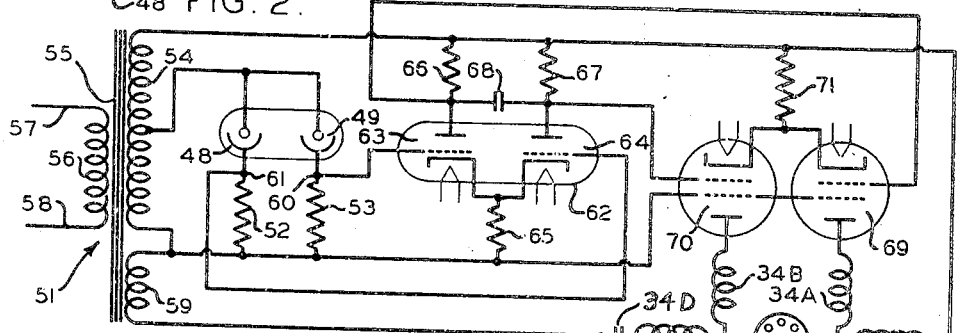
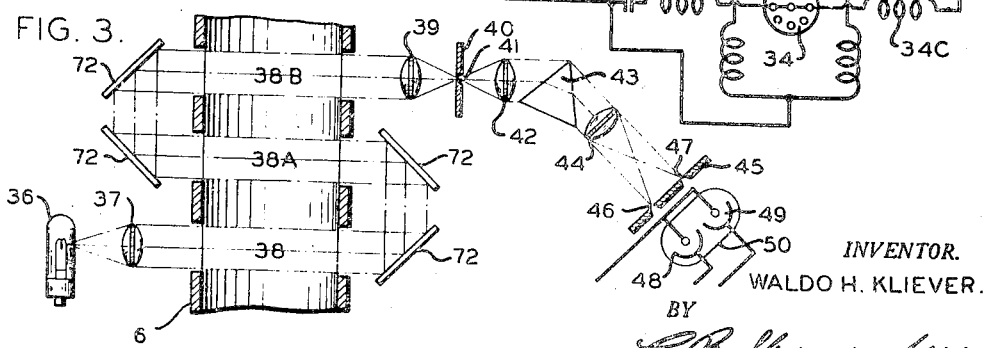
INVENTOR.
WALDO H. KLIEVER.
BY
ATTORNEY.

Patented Sept. 17, 1946

2,407,838

UNITED STATES PATENT OFFICE 2,407,838

MEASURING APPARATUS

Waldo H. Kliever, Minneapolis, Minn., assignor to The Brown Instrument Company, Philadelphia, Pa., a corporation of Pennsylvania Application September 30, 1942, Serial No. 460,326

4 Claims. (Cl. 88—14)

The general object of the present invention is to provide an improved method of, and improved apparatus for spectroscopic gas analysis. While not restricted to such use, the invention is of especial utility for flue gas analyses, and may be employed with especial advantage in regulating the fuel-air ratio of a boiler furnace, so as to maintain a desirable $CO_2$ content in the furnace flue gases.

My invention makes use of the well known optical principle that when light rays with varying wave lengths are transmitted away from a gaseous atmosphere through which the rays have passed or in which they have emanated, and said atmosphere includes a constituent, such as carbon dioxide, which has the property of emitting and selectively absorbing light rays having wave lengths corresponding to a restricted portion of the solar spectrum, the intensity of the transmitted light rays which have the same wave lengths as the rays emitted and selectively absorbed by said constituent, will vary relative to the intensity of the transmitted light rays having different wave lengths, to an extent dependent on the amount of the said constituent present in said atmosphere.

It has heretofore been proposed to utilize the above mentioned optical principle in the analysis of a gaseous atmosphere, by comparing, and thereby obtaining a measure of the difference between the intensity of light rays modified in intensity to a significant extent, by and in accordance with the composition of said atmosphere, and the intensity of light rays not so modified. So far as I am aware, however, no such method of gas analysis heretofore proposed has been free from the objection that the intensities of the light rays compared are dependent to a significant degree on some difference other than that due to the composition of the gaseous atmosphere analyzed.

Specifically stated, the primary object of the present invention is to provide a simple and effective method of, and apparatus for spectroscopic gas analysis which will eliminate or substantially minimize differences between the intensities of the light rays compared, which are due to causes other than spectral differences dependent on the composition of the gas analyzed; and my invention comprises and is characterized by the comparison of the intensities of two light beams which are formed from a single beam of light transmitted away from the gaseous atmosphere to be analyzed, by subjecting said single beam to a ray dispersing, or spectrum producing effect, and by segregating light rays so dispersed and having wave lengths differing little from those emitted and selectively absorbed by a significant constituent of said atmosphere to thereby form one of the two comparison beams of light, and including dispersed light rays which have suitably different wave lengths in the other of the two comparison beams.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described a preferred embodiment of the invention.

Of the drawing:

Fig. 1 is a diagrammatic representation of a boiler furnace control system including novel provisions for determining the $CO_2$ content of the boiler flue gases;

Fig. 2 is a diagrammatic representation of electronic amplifying means included in the apparatus shown in Fig. 1;

Fig. 3 is a diagrammatic representation of a modified form of a portion of the apparatus shown in Fig. 1; and Fig. 4 is a diagrammatic illustration of the use of spectroscopic apparatus differing in type from that shown in Fig. 1 and Fig. 3.

In Fig. 1, I have diagrammatically illustrated a boiler furnace control system in which use is made of the present invention in regulating the rate at which combustion air is supplied to a boiler furnace I, to which fuel is supplied at a rate depending on the boiler steam pressure. As diagrammatically shown, the boiler furnace comprises a boiler having upper steam and water drums 2, inclined water tubes 3 and equalizing tubes 4, and is baffled to provide up and down passes across the water tubes for the burning gases and products of combustion rising from the furnace grate 5 and passing away from the furnace through the flue gas outlet pipe 6. Solid fuel is supplied to the grate 5 by a stoker 7 at a rate depending on the speed of operation of a stoker motor 8. Steam is withdrawn from the boiler through a steam main pipe 9 for transmission to a turbine or other steam utilizing device (not shown).

As diagrammatically illustrated, the speed of the motor 8 is controlled in a known manner by regulating the amount of resistance 10 in series with the shunt field winding 11 of the motor which is energized by supply conductors 12 and 13. The amount of resistance 10 in circuit with the shunt field winding 11, is increased and decreased to thereby decrease and increase the speed of the motor 8 as the boiler steam pressure respectively increases and decreases, by a reversible control motor 14. The latter is energized by supply conductors 12 and 13 for operation in the direction to increase or decrease the speed of the stoker motor 8 by an automatic control system of which the actuating member is a Bourdon tube element 15, having its stationary end connected to the boiler drum 2 delivering steam to the header 9.

The expansion and contraction of the Bourdon tube 15, as the boiler steam pressure increases and decreases, gives clockwise and counter-clockwise movements, respectively, to a switch lever 16 pivoted at 17 and connected by a link 18 to the free end of the Bourdon tube 15. The switch 16 is connected to the supply conductor 12, and the motor 14 has one terminal connected to the supply conductor 13 and has its other terminal connected to one terminal of each of two series field windings 19 and 20, which are separately energized. The field windings 19 and 20 are so wound and disposed that when the winding 19 is energized the motor 14 will operate in the direction to decrease the speed of the stoker motor 8, and when the winding 20 is energized the motor 14 will operate in the direction to increase the speed of the stoker motor 8.

On a significant increase or decrease in the boiler steam pressure, the lever 16 is turned into engagement with a contact 21 or with a contact 22, respectively. The contact 21 is connected to the second terminal of the field winding 19 by a conductor 23, and the contact 22 is connected to the second terminal of the field winding 20 by a conductor 24. The field winding 19 is thus energized and the speed of the stoker motor is decreased when an increase in the boiler steam pressure causes the switch 16 to engage the contact 21. Conversely, a decrease in the boiler steam pressure which brings the switch 16 into engagement with the contact 22 energizes the field winding 20 and the motor 14 then operates in the direction to increase the speed of the stoker motor 8.

The contacts 21 and 22 are mechanically mounted on and supported by a member 25 which in the arrangement shown, is automatically adjusted to interrupt said engagement by moving the engaged contact away from the switch. As diagrammatically shown, the member 25 is a rack bar in mesh with a gear 26 rotated by a reversible motor 27. The latter has one terminal connected to the supply conductor 13 and has its other terminal connected by a series field winding 28 to the conductor 23 and connected by a second series field winding 29 to the conductor 24. The two field windings 28 and 29 are so wound and disposed that when the switch member 16 moves up, as seen in Fig. 1, into engagement with the contact 21, the energization of the field winding 28 will cause the motor 27 to rotate in the direction to raise the member 25, and thereby terminate the energization of the motors 14 and 8 initiated when the switch 16 engages the contact 21. Conversely, when the switch 16 engages the contact 22, the energization of the field winding 29 causes the motor 27 to rotate in the direction to lower the member 25 and thereby terminate the rotation of the motors 14 and 8 initiated when the switch 16 engages the contact 22.

As shown in Fig. 1, combustion air is supplied to the furnace 1 by a forced draft fan 30 at a rate determined by the speed of its driving motor 31. As shown, the motor 31 is a shunt wound motor energized by the supply conductors 12 and 13 and has its speed regulated by the operation of a reversible motor 34, which increases or decreases the amount of resistance 33 in series with the shunt field winding 32 of the motor 31, accordingly as it rotates in one direction or the other.

In accordance with the present invention, the motor 34 is automatically operated to increase and decrease the amount of combustion air supplied to the furnace 1, as required to maintain a desirable and approximately constant $CO_2$ content in the flue gases passing away from the boiler furnace through the fuel gas outlet 6, by control means including spectroscopic means responsive to said content. The spectroscopic means shown in Fig. 1, comprises an electric lamp 36 or other suitable source of light rays which are directed by a condensing lens 37 through transparent windows 38 in the opposite side walls of the gas outlet flue 6. The light rays thus transmitted through the lens 37 and windows 38 are focused by a lens 39 on a portion of an opaque light shield 40 including a slit 41. The light rays transmitted through the slit 41 are received by a collimating lens 42 which directs the parallel rays leaving it against one side of a prism 43 having its sides parallel to the slit 41.

The light passing through the prism 43 is refocused by a lens 44 to form a spectrum on an opaque screen or light shield 45, extending transversely across the axis of the lens 44. The shield 45 is formed with laterally displaced slits 46 and 47, each parallel to the slit 41. The wave lengths of the light rays passing through either of the two slits 46 or 47 will differ relatively little from one another, but will differ substantially from the wave lengths of the light rays passing through the other of the two slits. The light rays passing through the slit 46 impinge against a photo-electric cell 48 and the light passing through the slit 47 impinges against a photo-electric cell 49. The two photo-electric cells should be suitably related and may well be identical in construction and characteristics, and as shown both cells are enclosed in a single envelope 50.

For optimum results in determining the $CO_2$ content of the flue gases through the burner outlet 6, the light rays passing through one of the slits 46 and 47 and impinging against the corresponding photo-electric cell, should have wave lengths within a relatively narrow range including the wave lengths of light rays selectively absorbed by $CO_2$ and varying in intensity with the $CO_2$ content of the furnace gases; while the light rays passing through the other of said slits and impinging against the second photo-electric cell, should have such wave lengths that their intensity will be affected but little, if at all, by a variation in the $CO_2$ content of the furnace gases. With any given $CO_2$ content in the furnace gases, as those skilled in the art will understand, the precise relation between the wave lengths of the light rays respectively impinging against the two photo-electric cells, will be determined by the composition and form of the prism and to some extent by its angular adjustment about an axis parallel to its corner edges.

In operation each of the photo-electric cells 46 and 49 will maintain an electro-motive force proportional to the intensity of the light transmitted to the photo-electric cell through the corresponding slit 46 or 47, respectively. The apparatus may, and is hereinafter assumed to be so proportioned and calibrated that the electromotive forces developed by the two photo-electric cells, will be equal when the $CO_2$ content of the flue gases has its desired normal value. Such proportioning and calibrating may be accomplished either by varying the widths of the slits 46 and 47 or by adjusting the magnitudes of the resistances 52 and 53. In consequence, the electro-motive force of one of the cells, hereinafter assumed to be the cell 48, will exceed or be less than the electro-motive force of the cell 49 when the value of the $CO_2$ content is respectively below or above its normal value.

While I have disclosed the use of photoelectric cells for detecting variations in the intensity of radiant energy transmitted through the slits 46 and 47, it will be understood that other forms of apparatus may be used for this purpose such, for example, as bolometers or radiation thermopiles. Radiation sensitive devices of these types have particular utility in the apparatus of my invention when the wave lengths of radiation transmitted through the slits 46 and 47 lie near the infra-red spectrum. The manner in which such substitution may be made will be apparent to those skilled in the art, and therefore, a detailed description thereof is believed unnecessary. For example, a bolometer of suitable design may be connected in the circuit of Fig. 2 in place of each of the photocells.

While a variation in the $CO_2$ content of the furnace gases will vary the electro-motive force of one, but not the other of the two photoelectric cells, a variation in the intensity of the illumination of the lamp 36, or a variation in the transparency of the furnace gas between the windows 38, which is not due to a variation in the $CO_2$ content of the gas, will have substantially similar effects upon the intensity of the light transmitted to, and the electro-motive force of each of the photo-electric cells. In consequence, the relative electromotive forces maintained by the two photo-electric cells will be substantially dependent on the $CO_2$ content of the furnace gas, and will be substantially independent of variations in the intensity of the light emission of the lamp 36, and of any condition similarly varying the intensity of the light transmitted to each photo-electric cell.

The relative variations in the electro-motive forces of the two photo-electric cells 48 and 49 may be utilized in any known or suitable manner to regulate the operation of the reversible control motor 34, so as to increase or decrease the rate of combustion air supply to the furnace as the $CO_2$ content of the furnace flue gas becomes undesirably high or undesirably low. As shown, the cells 48 and 49 control the operation of motor 34 through electronic amplifier means 51, which may well take the known form illustrated diagrammatically in Fig. 2.

As shown in Fig. 2 the photocells 48 and 49 are connected in a bridge circuit, one branch of which includes the cell 48 and a resistance 52 while the other branch includes the cell 49 and a resistance 53. The bridge circuit receives energizing current from a section of the secondary winding 54 of a transformer 55, which has its primary winding 56 connected to and energized by alternating current supply conductors 57 and 58. The transformer also includes an additional secondary winding 59, the purpose of which is hereinafter explained.

The terminals or junctions 60 and 61 of the bridge circuit which normally have the same potential, are connected to the input circuit of an electronic valve 62 of the twin type including two triodes in one envelope. Thus, as shown, the bridge terminal 60 is connected to the control grid of the triode 63 and the terminal 61 is connected to the control grid of the triode 64. The cathodes of the two triodes are connected through a common biasing resistance 65 to the terminals of the resistances 52 and 53, respectively remote from the photoelectric cells 48 and 49. Plate energizing current is supplied to the triodes 63 and 64 by the transformer secondary winding 54. As shown, the plate circuit of the triode 63 includes a resistance 66 connecting the upper end of the winding 54 to the plate of the triode 63, and a connection including the resistance 65 between the cathode of triode 63 and the lower end of the secondary 54. The plate circuit for the triode 64 differs from that for the triode 63 only in that the plate of triode 64 is connected to the upper end of the transformer secondary 54 by the resistance 67. A condenser 68 of suitable value is connected between the ends of the resistances 66 and 67, respectively adjacent the plates of the triodes 63 and 64.

When the photocells 48 and 49 are equally illuminated, the triodes 63 and 64 will be equally conductive and the potential drop across the resistance 66 will be equal to that across the resistance 67. Upon an increase or decrease in the illumination of the photocell 48 relative to that of the photocell 49, the triode 64 will be rendered more or less conductive than the triode 63 and the potential drop across resistance 67 will then respectively exceed or be less than that across resistance 66.

The potential drop across the resistance 66 is impressed on the input circuit of an electronic valve 69, and the potential drop across the resistance 67 is impressed on the input circuit of an electronic valve 70. The valves 69 and 70 are shown as screen grid type tetrodes, receiving energizing current from the transformer secondary windings 54 and 59, which are connected in series so that their voltages are additive. As shown, the plate circuit of the tetrode 69 includes one winding 34A of the motor 34 through which the anode of the valve 69 is connected to the lower terminal of the secondary winding 59, and a cathode biasing resistance 71 connecting the cathode of the valve 69 to the upper end of the secondary winding 54. The plate circuit of the tube 70 includes the winding 34B of the motor 34 through which the anode of valve 70 is connected to the lower end of the secondary winding 59, and includes the resistance 71 through which the cathode of the valve 70 is connected to the upper end of the winding 54.

A third winding 34C of the motor 34 is also energized from the transformer secondary windings 54 and 59 through a condenser 34D of suitable value. The motor windings 34A, 34B and 34C are so related and disposed that reaction between the magnetic fields produced by the windings 34B and 34C tends to produce rotation of the motor 34 in one direction, while the reaction between the magnetic fields produced by the windings 34A and 34C tends to rotate the motor in the opposite direction. In consequence, the motor 34 rotates in one direction or the other accordingly as the energization of the winding 34A exceeds or is less than that of the winding 34B, and the motor 34 stalls when the windings 34A and 34B are similarly energized.

The plate circuits of the tubes 69 and 70 are connected across the transformer secondary windings 54 and 59 in a direction opposite to that in which the plate circuits of the triodes 63 and 64 are connected across the transformer secondary winding 54. In consequence, control of the conductivity of the tubes 69 and 70 in accordance with the potential drops across the resistances 66 and 67 is permitted, because the condenser 68 holds over the potential drops produced across the resistances 66 and 67 in one-half cycle when the triodes 63 and 64 are conductive, to the next half cycle when the tubes 69 and 70 are conductive.

Upon the assumption that an increase in the $CO_2$ content of the furnace gases above its normal value will result in a decrease in the E. M. F. of the cell 48, it will also result in an increase in the potential drop across the resistance 66 relative to that across the resistance 67. The tube 70 will be rendered more conductive than the tube 69, and the energizing current in the motor winding 34B will then exceed that in the motor winding 34A, and the motor 34 will rotate in the direction to increase the rate at which combustion air is supplied to the furnace by the fan 30. Conversely, upon a decrease in the $CO_2$ content and an increase in the potential drop across the resistance 67 relative to that across the resistance 66, the tube 69 will become more conductive than the tube 70, the energization of the motor winding 34A will exceed that of the winding 34B and the motor 34 will rotate in the direction to decrease the rate of combustion air supply.

Operative results of the character which the apparatus shown in Fig. 1 is intended to produce, can be obtained with apparatus of quite different form. For example, instead of passing light from the lamp 36 once across the path of flow of the furnace gases, as shown in Fig. 1, the furnace gas outlet may be provided with spaced apart pairs of windows 38, 38A, and 38B, and mirrors 72 may be associated with said windows as shown in Fig. 3, so that light from the lamp 36 will pass across the path of flue gas flow between the lenses 37 and 39 three times instead of once as it does in the construction shown in Fig. 1. The optical system between the lens 39 and the photoelectric cells 48 and 49 of Fig. 3 may be, and as shown is, exactly like the corresponding portion of the optical system shown in Fig. 1. As will be apparent, the passage of the light from the lamp 36 across the outlet 6 a plurality of times as provided for in Fig. 3 will, with other things still equal, materially increase the effect of a given change in the $CO_2$ content of the furnace flue gases on the relative E. M. F.'s of the cells 48 and 49.

In the form of my invention illustrated in Fig. 4, the prism 43 and lenses 42 and 44 of Fig. 1 are replaced by an opaque concave diffraction grating 73 of well known type. Except for that replacement, and the necessary accompanying changes in the relative positions of the light shields 40 and 45 and cells 48 and 49, the apparatus including the modification shown in Fig. 4 need not differ from the apparatus shown in Fig. 1 or in Fig. 3.

As those skilled in the art will understand, the type of apparatus shown and described herein is relatively inexpensive to construct and is simpler than apparatus customarily used for flue gas analysis, and has special advantages already made apparent. While I have illustrated the use of my invention in a boiler furnace control system, those skilled in the art will understand that the principle of the present invention is adapted for use for many different purposes in which it is advantageous to determine the composition of a gas from its light emissive or selective absorption properties.

While in accordance with the provisions of the statutes, I have illustrated and described the best forms of embodiment of my invention now known to me, it will be apparent to those skilled in the art that changes may be made in the form of the apparatus disclosed without departing from the spirit of my invention, as set forth in the appended claims and that in some cases certain features of my invention may be used to advantage without a corresponding use of other features.

Having now described my invention, what I claim as new and desire to secure by Letters Patent, is:

1. The spectroscopic method of continuously analyzing the composition of a stream of gas moving along a predetermined flow path which consists in passing a beam of radiant energy including rays of different wave lengths into interception with the gas stream in a predetermined portion of said path, dispersing the beam rays passing through said stream in accordance with their wave lengths to form a spectrum, and selecting from said spectrum a first beam of rays of wave lengths which are not substantially absorbed by carbon dioxide and a second beam of rays of wave lengths which are absorbed by carbon dioxide, the said wave lengths being such that the intensity of the second beam is equal to the intensity of the first beam when the gas includes a predetermined carbon dioxide content and no other substance which selectively affects one of said beams to a significant extent, comparing the intensities of said selected beams, utilizing each of said selected beams to create an electromotive force proportional to the intensity of that beam, and applying said electromotive forces to an indicating means to produce an indication proportional to the difference between said intensities.

2. The spectroscopic method of analyzing the composition of a gas which consists in passing a beam of radiant energy including rays of different wave lengths through said gas, dispersing the beam rays passing through said gas in accordance with their wave lengths to form a spectrum, and selecting from said spectrum a first beam of rays of wave lengths which are not substantially absorbed by carbon dioxide and a second beam of rays of wave lengths which are absorbed by carbon dioxide, the said wave lengths being such that the intensity of the second beam is equal to the intensity of the first beam when the gas includes a predetermined carbon dioxide content and no other substance which selectively affects one of said beams to a significant extent, comparing the intensities of said selected beams, utilizing each of said selected beams to create an electromotive force proportional to the intensity of that beam, and applying said electromotive forces to an indicating means to produce an indication proportional to the difference between said intensities.

3. Apparatus for continuously analyzing the composition of a gas, comprising means to convey said gas along a predetermined flow path, means for passing a beam of radiant energy including rays of different wave lengths through the gas stream, means for dispersing the beam rays passing through said stream in accordance with their wave lengths to form a spectrum, means for selecting from said spectrum a first beam of rays of wave lengths which are not substantially absorbed by carbon dioxide and a second beam of rays of wave lengths which are absorbed by carbon dioxide, the said wave lengths being such that the intensity of the second beam is equal to the intensity of the first beam when the gas includes a predetermined carbon dioxide content and no other substance which selectively affects one of said beams to a significant extent, means for creating an electromotive force proportional to the intensity of each beam, an indicating means, and means for applying said electromotive forces to said indicating means to produce an indication proportional to the difference between said intensities.

4. Apparatus for analyzing the composition of a gas, comprising means for passing a beam of radiant energy including rays of different wave lengths through said gas, means for dispersing the beam rays passing through said gas in accordance with their wave lengths to form a spectrum, means for selecting from said spectrum a first beam of rays of wave lengths which are not substantially absorbed by carbon dioxide and a second beam of rays of wave lengths which are absorbed by carbon dioxide, the said wave lengths being such that the intensity of the second beam is equal to the intensity of the first beam when the gas includes a predetermined carbon dioxide content and no other substance which selectively affects one of said beams to a significant extent, means for creating an electromotive force proportional to the intensity of each beam, an indicating means, and means for applying said electromotive forces to said indicating means to produce an indication proportional to the difference between said intensities.

WALDO H. KLIEVER.